United States Patent [19]

Neven et al.

[11] Patent Number: 4,715,233

[45] Date of Patent: Dec. 29, 1987

[54] SENSOR FOR MAGNETIC-INDUCTIVE FLOWMETERS

[75] Inventors: Jozef H. M. Neven, Meerssen; Boodewijn J. Poortman, Dortrecht; Wouter T. Tromp, Sliedrecht, all of Netherlands; Udo Stevens, Moers, Fed. Rep. of Germany

[73] Assignee: Rheometron AG, Basel, Switzerland

[21] Appl. No.: 930,181

[22] PCT Filed: Mar. 10, 1986

[86] PCT No.: PCT/EP86/00129

§ 371 Date: Oct. 14, 1986

§ 102(e) Date: Oct. 14, 1986

[87] PCT Pub. No.: WO86/05873

PCT Pub. Date: Oct. 9, 1986

[30] Foreign Application Priority Data

Mar. 27, 1985 [DE] Fed. Rep. of Germany ....... 3511033

[51] Int. Cl.$^4$ ................................................ G01F 1/58
[52] U.S. Cl. ................... 73/861.12; 336/198
[58] Field of Search .................... 73/861.12; 336/198

[56] References Cited

U.S. PATENT DOCUMENTS

| 3,112,898 | 12/1963 | Stahl | 336/198 X |
|---|---|---|---|
| 4,454,766 | 6/1984 | Reinhold et al. | 73/861.12 |
| 4,470,309 | 9/1984 | Wada | 73/861.12 |
| 4,507,975 | 4/1985 | Bittner et al. | 73/861.12 |

Primary Examiner—Charles A. Ruehl
Attorney, Agent, or Firm—Townsend & Townsend

[57] ABSTRACT

A sensor for magnetic-inductive flowmeters in defined by a sensing tube (3) disposed in a steel housing (1) and fitted with sensing electrodes (5). Two opposing magnetic coils (6) are mounted to the exterior of the tube. The coils (6) have a bolt-shaped core (7) which have saddle-shaped bases that engage the outer wall of sensing tube (3). A simplified mounting of magnetic coils (6) in steel housing (1) is achieved with flange-like webs (12) mounted adjacent an upper end (11) of coil core (7). The webs are positioned within steel housing (1) by support surfaces (29). A winding bobbin (14) is constructed of two semi-cylindrical halves (15,16) which are disposed about coil core (7) and are locked to each other with a spring catch (22). The coil wire (17) is wound about the bobbin (14) secured to core (7).

7 Claims, 8 Drawing Figures

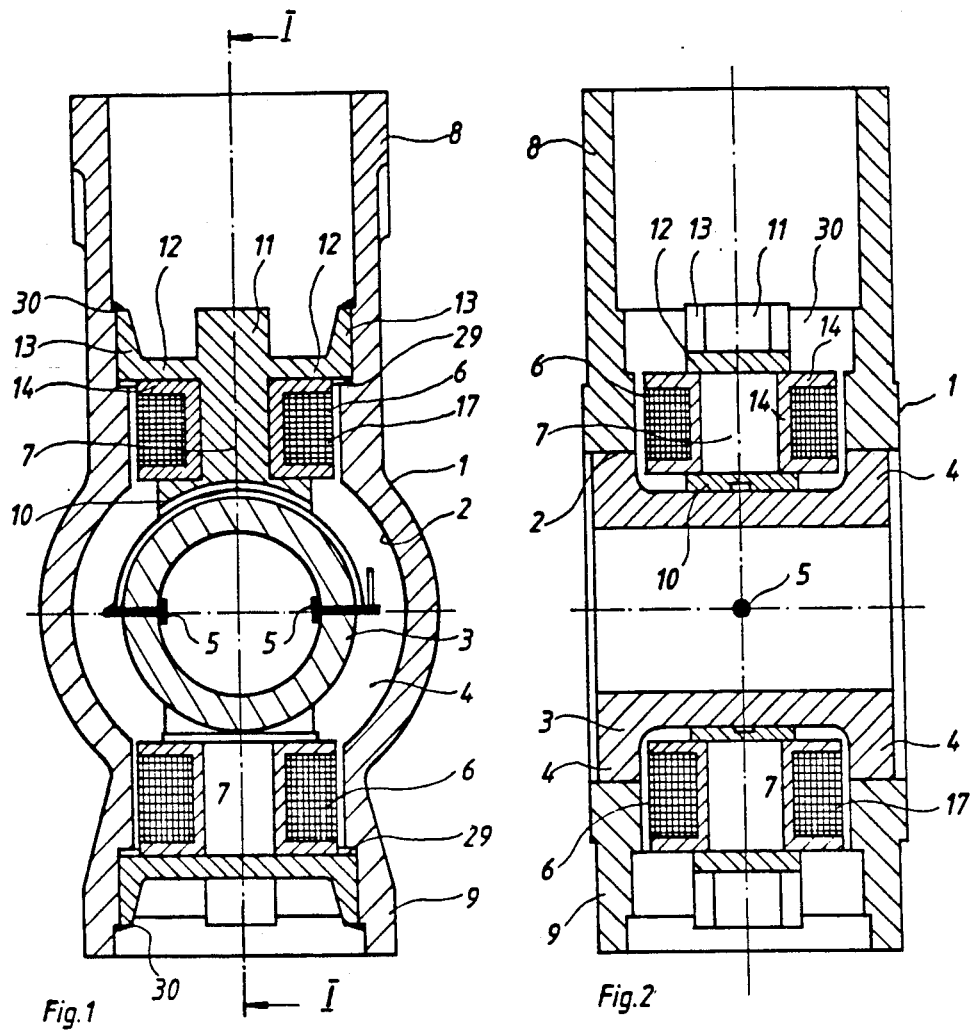
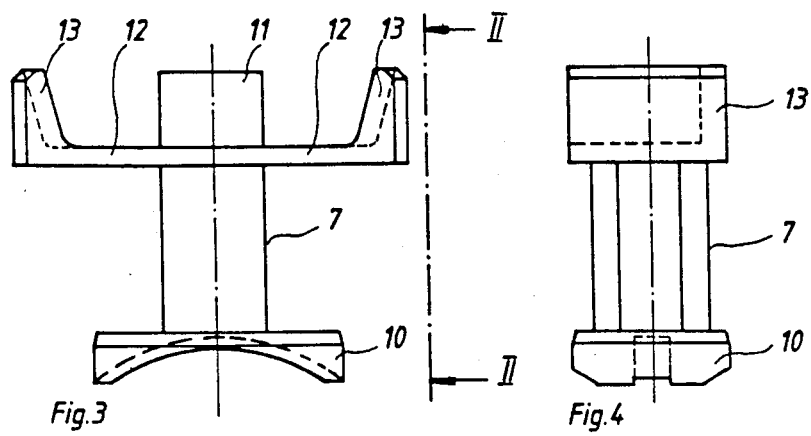
Fig. 1  Fig. 2  Fig. 3  Fig. 4

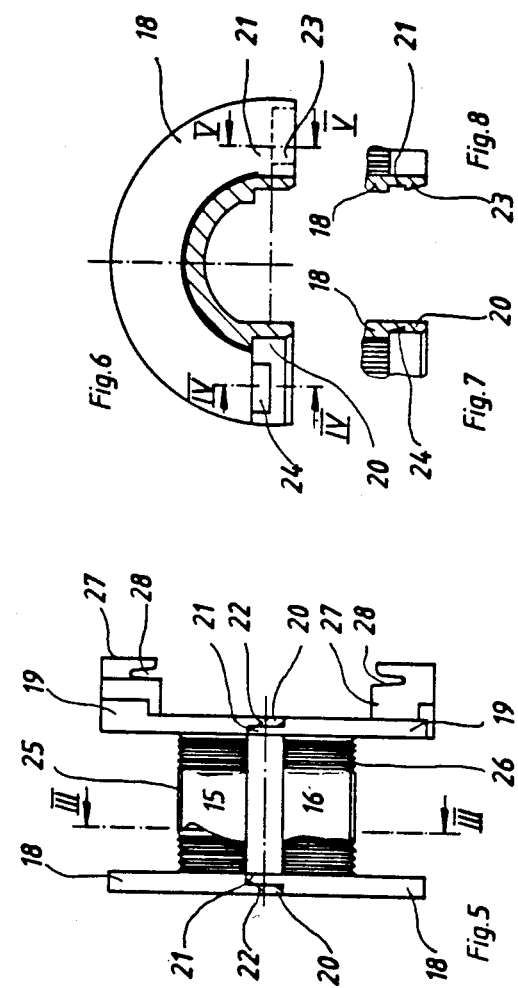

SENSOR FOR MAGNETIC-INDUCTIVE FLOWMETERS

BACKGROUND OF THE INVENTION

The invention relates to a sensor for magnetic-inductive flowmeters in which a sensing tube equipped with sensing electrodes is disposed within a steel housing. Two magnetic coils are mounted on the tube opposite from one another. Each coil has a bolt-shaped or cylindrical core fitted with a flange-like base and engages an outer wall of the measuring tube. The other end of the core is affixed to the housing. The coil further includes a dielectric winding bobbin.

In a known sensor of this kind wire is coiled about the bobbin and the bobbin with the wire is then slipped over the core. The coil is fixedly mounted to the steel housing and the bobbin is secured against axial shifting by positioning a take-up washer between the bobbin and a cover plate carried by the core. The coil is secured with a snap ring in an annular groove of the steel housing. Such a mounting of the coil requires multiple parts, results in a relatively unwieldily construction and high costs, and is unsuited for use on automatic assembly lines.

An object of the present invention is thus to devise a sensor of this kind that is of a simple construction and facilitates its assembly so that, when needed, it can be carried out by robots and/or an automatic assembly line.

The present invention achieves this object by providing the core with a flange affixed to its upper end and by constructing the bobbin of two semi-cylindrical halves which extend about the core, and on which the conductor wire is wound.

Preferably, the flange is integrally formed with the core by casting both together. In this manner the prefabricated core can be attached to the steel housing by welding of the like.

Given such a core construction, the bobbin can no longer be axially slipped over the core. Hence, the bobbin is longitudinally split so that both semicylindrical halves or components can be applied to the core by moving them in a radial direction towards the core. The conductor wire is then wound around the bobbin after the latter has been placed over the core. A particularly good magnetic grounding of both magnetic coils is achieved through the flange which is in direct contact with the steel housing.

The core flange is preferably formed of two integrally cast, diametrically opposite webs the outer ends of which include areas which are formed to engage the steel housing. These areas establish a tight fit and are welded to the housing. The two halves of the bobbin are attached to the core by providing them with partially overlapping end flanges which are secured to each other with a spring catch or the like. The outer, cylindrical winding surface of the bobbin has guide grooves which facilitate a tightly packed winding of the conductor wire. This also enhances the sensing characteristic of the instrument. One end flange of the bobbin, which is preferably constructed of plastic material, has two wire clamps for receiving and attaching the ends of the conductor wire. This allows for a more precise positioning and fixing of the wire on the bobbin.

An embodiment of the invention is shown in the drawings.

BRIEF DESCRIPTION OF THE DRAWINGS

FIG. 1 is a cross-section of a sensor for magnetic-inductive flowmeters constructed in accordance with the present invention;

FIG. 2 is a cross-section taken along lines I—I of FIG. 1;

FIG. 3 is a side view of only the core of the sensor shown in FIG. 1;

FIG. 4 is an end view taken along lines II—II of FIG. 3;

FIG. 5 is a side view of an electro-magnetic coil construction in accordance with the invention;

FIG. 6 is a cross-section taken along lines III—III of FIG. 5;

FIG. 7 is a cross-section taken along lines IV—IV of FIG. 6; and

FIG. 8 is a cross-section taken along lines V—V of FIG. 6.

DESCRIPTION OF THE PREFERRED EMBODIMENTS

As shown in FIGS. 1 and 2, a sensor constructed in accordance with the invention principally comprises a steel housing 1 having a bore 2 for a sensing tube 3. The tube has two opposing sensing electrodes 5 and, at 90° angles thereto, two electro-magnetic coils 6 which are also opposite one another. Sensing tube 3, through which the medium flows, is preferably constructed of a densely sintered ceramic material and is tightly secured to bore 2 by means of end flange 4. The flange is shrunk or cemented to the boring. Steel housing 1 also serves as a conventional magnetic grounding because cores 7 of the electro-magnetic coils 6 are in direct and intimate contact with the housing. For the proper mounting and positioning of coils 6, steel housing 1 includes two tubular, cylindrical sleeves 8,9 which extend radially from the flow axis.

FIGS. 3 and 4 are enlarged views of an electromagnetic core 7. At one end the core has a saddle-shaped base 10. At its other end 11 the core carries a flange defined by two webs 12 integrally cast with the core and extending in opposite directions. The outer ends have areas 13 which are in contact with the steel housing 1. Core 7, base 10, webs 12 and areas 13 form a unitary preferably integrally cast part.

A bobbin 14, which is part of magnetic coil 6 and is formed of plastic or an other dielectric material, cannot be axially slipped over the core due to the presence of base 10 and of web 12 at upper end 11 of core 7. Consequently, the bobbin is constructed of two semicylindrical halves 15,16 over which a coil wire 17 is wound. Bobbin halves 15,16 have partially overlapping end flanges 18, 19, best shown in FIGS. 5-8, for securing them to coil core 7. To this end the flanges include extensions 20,21 connected to each other by a spring catch 22 which, in the preferred embodiment includes cooperating protrusions 23 and recesses 24. These are alternatively positioned on extensions 20,21 so that bobbin halves 15,16 snap-lock to each other when the halves are forced together to thereby securely position the bobbin on coil core 7.

The exterior surface of bobbin 14 has guide grooves 26 for coil wire 17 so that the wire can be wound as tightly as possible on bobbin 14. The ends of the wound wire 17 are securely fastened to the bobbin with wire clamps 27. In that purpose the clamps have wedgeshaped notches 28 and they are preferably molded to one of the end flange 18,19 of the bobbin.

The prefabricated electro-magnetic cores 6 are inserted into sleeves 8,9. To assure an accurate fit both sleeves 8,9 have a shoulder 29 against which webs 12 of core 7 rest. The electro-magnetic coils 6 are affixed to the housing by welding areas 13 to weld surfaces 30 of the two sleeves.

What is claimed is:

1. A flow sensor for magnetic-inductive flowmeters comprising a housing including a first bore extending therethrough, a sensing tube disposed within the housing and extending through the first bore, sensing electrodes mounted to the tube, first and second electromagnetic coils mounted to the housing, each having a core including first and second flanges proximate respective ends of the core, one of the core ends being affixed to the housing and the other one of the core ends being in contact with the sensing tube, a bobbin for each coil constructed of a dielectric material defined by first and second, generally semi-cylindrical bobbin segments shaped so that the segments can be placed about an intermediate portion of the core located between the flanges, and a conductor wire wrapped about the semi-cylindrical bobbin segments.

2. A sensor according to claim 1 wherein the core flange at said one end of the core comprises first and second webs constructed integrally with the core, extending in substantially opposite directions from the core, and having outer ends provided with arms in contact with the housing.

3. A sensor according to claim 1 wherein the first and second bobbin segments each include an end flange positioned and formed so that the end flanges are in substantial radial alignment with each other and partially overlap, and including a spring catch for securing the end flanges and thereby the semi-cylindrical segments to each other and to the intermediate core portion.

4. A sensor according to claim 1 wherein the bobbin segments surrounding the core include a convex exterior surface having a plurality of guide grooves for the conductor wire.

5. A sensor according to claim 1 including first and second wire clamps attached to at least one bobbin segment for securing ends of the conductor wire carried on the bobbin.

6. A sensor for magnetic-inductive flowmeters comprising a steel housing defining first and second, substantially perpendicular and intersecting passages through the housing; a sensing tube substantially concentrically disposed in the first passage for flowing a fluid medium therethrough; first and second sensing electrodes attached to the tube and communicating with an interior of the tube; first and second electromagnetic coils carried by the sensor, each coil including a generally cylindrical core, an enlarged base at one end of the core and a flange at the other end of the core, the base being in contact with an exterior wall of the sensing tube and the flange being substantially immovably attached to the housing and magnetically coupled thereto, the cores being disposed in the second passage, a bobbin constructed of a dielectric material disposed about the core and positioned intermediate the base and the flange, the bobbin being longitudinally split to define first and second bobbin segments each adapted to be placed about the core by moving it in a generally radial direction towards the core, snap-in locking means carried by the bobbin segments for securing the segments to the core and to each other by forcing the segments towards each other to thereby engage the locking means; and a conductor wire wrapped about an exterior, generally convex surface of the bobbin.

7. A sensor according to claim 6 including welds securing the core flanges to the housing.

* * * * *